Jan. 31, 1967  E. HENRY-BIABAUD  3,301,248
HEATING APPARATUS FOR AUTOMOTIVE VEHICLES
Filed July 7, 1965  7 Sheets-Sheet 7

United States Patent Office 3,301,248
Patented Jan. 31, 1967

3,301,248
HEATING APPARATUS FOR AUTOMOTIVE VEHICLES
Edmond Henry-Biabaud, Paris, France, assignor to Société Anonyme Andre Citroen, Paris, France
Filed July 7, 1965, Ser. No. 470,153
Claims priority, application France, July 7, 1964, 980,952, Patent 1,409,337; Jan. 15, 1965, 2,110
16 Claims. (Cl. 126—110)

The present invention relates in general to heaters for automotive vehicles and has specific reference to a heating apparatus of the fuel combustion type, characterized in that it comprises a casing of elongated configuration, open at both ends for the ingress of cold air and egress of warm air respectively, an electromotor mounted on said casing and having its armature rotatably solid with a fan forcing the heating air into this casing, a combustion device comprising an elongated body acting as a heat exchanger or heat transfer unit, said body being mounted within, and somewhat spaced from the inner wall of, said casing in order to provide a space through which the heating air is forced by said fan, said body comprising at its downstream end, as seen in the direction of flow of the heating air, a combustion chamber connected to a fuel feed device and a spark plug housed in said chamber and connected to an electric ignition device, said body communicating at its upstream end with a fan rotatably driven from said electromotor driving said heating air fan for sucking combustion gas out from said chamber.

The heating apparatus according to this invention is advantageous in that it is extremely simple to manufacture and assemble, and in addition it is associated with a control and safety device mounted on the casing of the apparatus and capable of providing an adjustment range and a degree of safety corresponding to all circumstances of normal operation.

The essential safety feature characterizing the apparatus of this invention lies in the fact that in operation the circuit of the combustion gas is vacuumized whereas the heating air circuit is under a positive pressure, thus precluding in all cases the accidental passage of combustion gas into the heating air stream.

In order to afford a clearer understanding of this invention and of the manner in which the same may be carried out in practice, reference will now be made to the accompanying drawings illustrating diagrammatically by way of example various forms of embodiment of the heating apparatus constituting the subject-matter of this invention. In the drawings.

The heating apparatus according to this invention comprises a casing consisting of a plurality of assembled elements, namely a cylindrical sleeve 1, of metal or other suitable material, which is fitted and secured at one end on a pair of cast shells 2, 3 assembled by means of screws 4. The shell 2 comprises a cylindrical skirt 5 constituting a fresh air inlet and the casing 1 is open at its end 1a through which the warm air produced by the apparatus is delivered.

Within the shell assembly 2, 3 an electromotor 6 is housed, this motor having its shaft 7 disposed transversely to said sleeve 1 and journaled in bearings 8, 9 carried by said shells 2, 3. The armature of this electromotor is adapted rotatably to drive a heating air fan 11 secured on a flange 12 keyed at 13 on the armature shaft 7. This fan forces the heating air along a path shown diagrammatically by the dashed arrows f.

Secured in the cylindrical skirt 5 of shell 2 by means of screws 14 is a cross member 15 supporting a contact breaker 16 rotatably mounted about a pivot pin 17 and responsive to a cam 18 rotatably rigid with the shaft of motor 6.

This contact breaker 16 is an integral part of the electric ignition circuit to be described presently. A perforated case 19 extends across the fresh air inlet orifice and protects the component elements described hereinabove.

Figure 1:
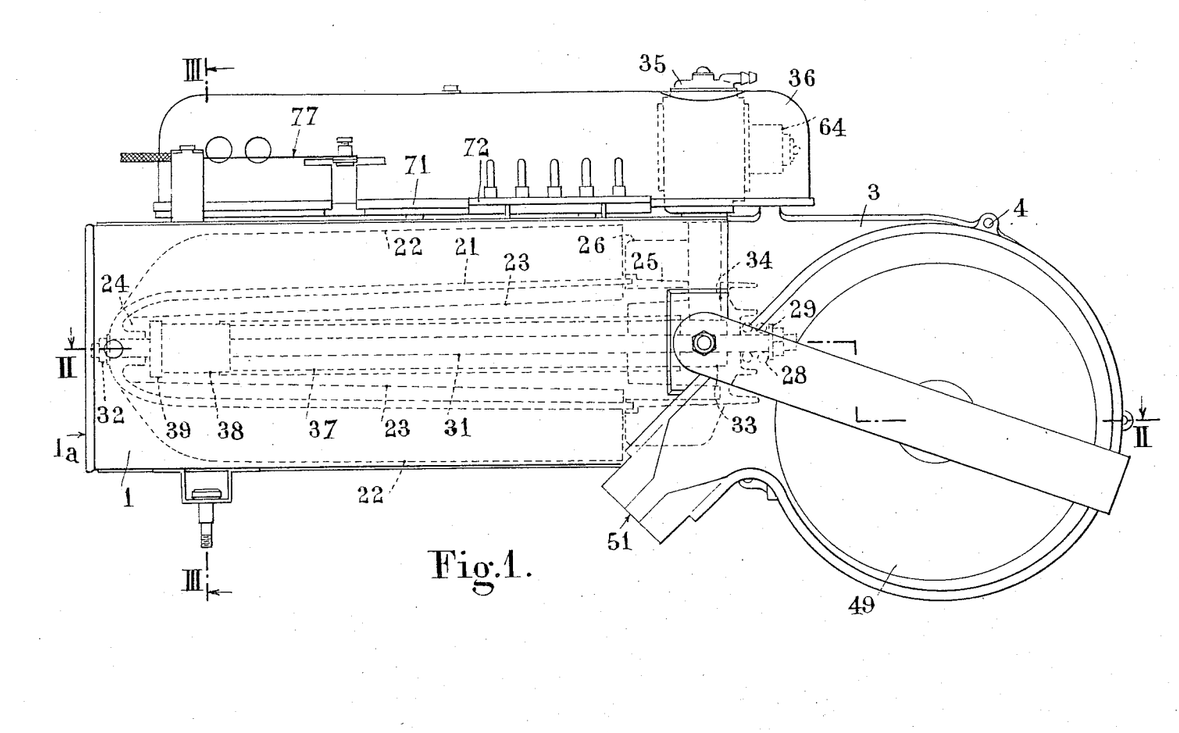
FIGURE 1 is an elevational view showing a heating apparatus of the fuel combustion type constructed according to the teachings of this invention.
Figures 2, 8:
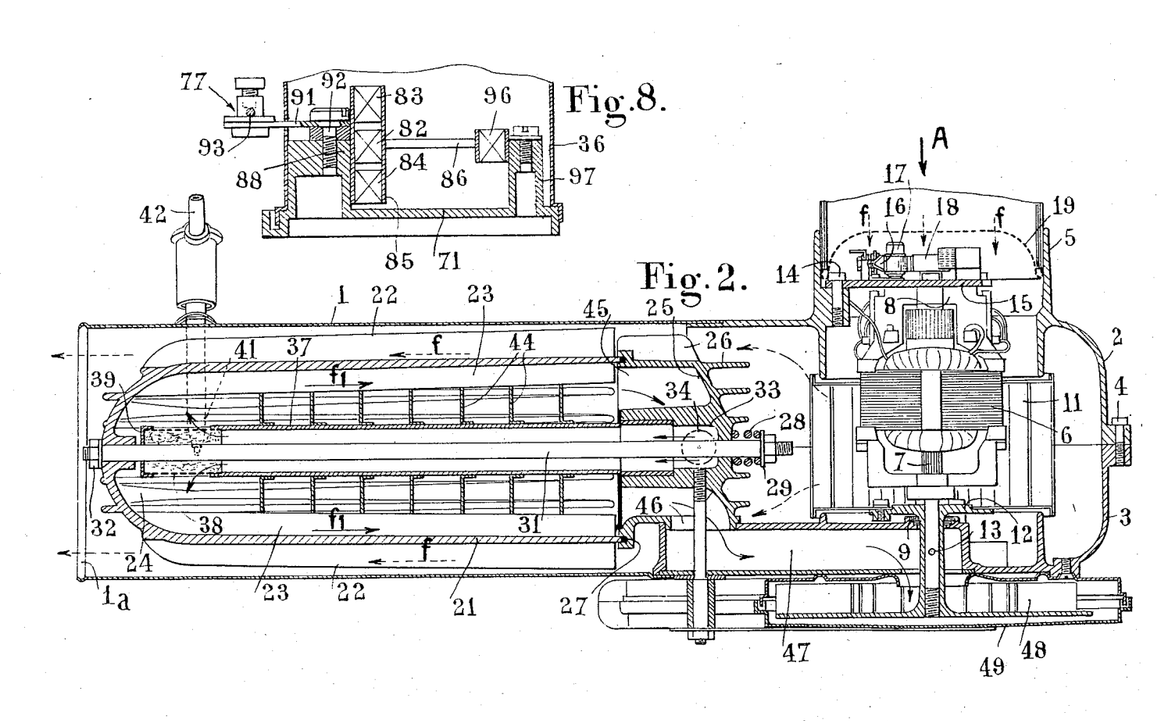
FIGURE 2 is a section taken upon the line II–II of FIGURE 1.
FIGURE 8 is a cross-sectional view taken upon the line VIII—VIII of FIGURES 6 and 7.
Figure 3:
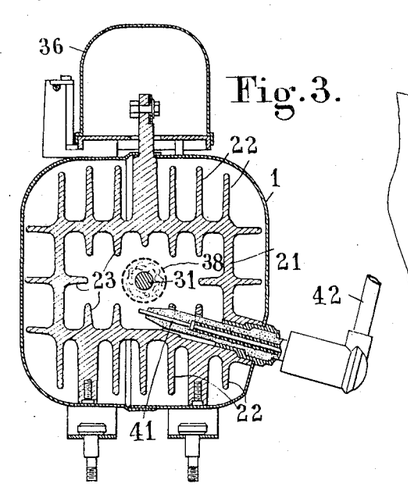
FIGURE 3 is a cross-sectional view of the same apparatus the section being taken upon the line III–III of FIGURE 1.
Figure 4:
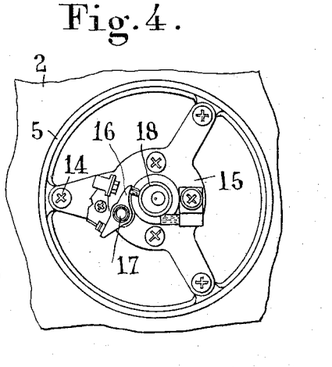
FIGURE 4 is an elevational view showing the contact breaker of the electric ignition device, as seen in the direction of the arrow A of FIGURE 2.

The sleeve 1 encloses the combustion device proper. This device comprises a light-alloy heat transfer device incorporating a prismatic body 21 provided with longitudinal external and internal fins 22 and 23 respectively, this body being advantageously manufactured by the die-casting process. This elongated body 21 is closed at both ends. This closing is obtained at the downstream end (according to the direction of flow of the heating air as shown by the arrows f) by means of a cover or cap forming the combustion chamber 24, and at the upstream end by a case 25 formed with external fins 26, this case being also obtained by the die-casting process. If permitted by this casting technique, one of the two closing members may be an integral part of the prismatic body 21, as illustrated in FIGURE 2 wherein the cap or cover 24 is an integral part of the body 21.

The case 25 is fitted on the body 21 and a gasket 27 is interposed therebetween. This case 25 is locked against the body 21 by a coil compression spring 28 bearing on the one hand against the case 25 and on the other hand against a washer 29 retained on the end of a central bolt 31. This central bolt extends axially through the body 21 and cover 24, and is locked on this cover 24 by means of a nut 32. This arrangement permits of compensating the expansion of metal parts.

In its central portion the case 25 has an axial passage 33 communicating through a radial duct 34 with a diaphragm-type carburettor 35 mounted on the upper portion of the apparatus and enclosed in a protection casing 36. The diaphragm carburettor, which may be of any known and suitable type, will be described presently in detail with reference to FIGURE 5.

The axial passage 33 of case 25 is connected to a tube 37 mounted coaxially within the body 21 of the heat transfer device. Centrally of this hub is the aforesaid bolt 31 securing the case 25 to the body 21. At the end of tube 37 which is opposite to the case 25, a cylindrical grid or wire mesh 38 is mounted; the grid or wire mesh 38 has its bottom closed by a transverse cup 39 carried by the bolt 31. This grid 38 is thus located within the combustion chamber closed by said cover 24. Projecting in this chamber is a spark plug 41 extending through the walls of the heat transfer body 21 and sleeve 1. This spark plug is connected by means of a suitable conductor 42 to an electric pulse generator, for example an induction coil 43 (FIGURE 6) controlled by the aforesaid contact-breaker 16 or by a vibrator.

The tube 37 carries a plurality of external insert baffle-forming elements 44 extending between this tube and the internal fins 23 of body 21.

The interior of this body communicates at its upstream end with an annular chamber 45 formed in the case 25 and surrounding the central passage 33, this chamber communicating through a duct 46 also formed in the case 25 with a channel 47 bounded by the shell 3 and isolated from the internal volume formed by said shells 2 and 3 in which the motor 6 and fan 11 are housed. The shaft 7 of electromotor 6 projects into this channel 47.

A centrifugal fan 48 is secured on that portion of shaft 7 which emerges in the channel 47 and the fan is housed in a casing 49 provided with a tangent outlet pipe 51.

From the foregoing it will be seen that when the heating apparatus is operated, that is, when the electromotor 6 is energized and the fuel feed device and the electric ignition device operate, the carburetted gas issuing from the diaphragm-type carburettor 35, which is drawn by the fan 48, flows through the ducts 34 and 33, and subsequently through the tube 37 and grid 38 into the combustion chamber formed by the cover 24. Then this gas is ignited by the spark plug 41 and the flame produced by the combustion spreads throughout the length of the body 21 of the heat transfer device, as shown by the arrows $f1$, and, due to the provision of the fins 23 and baffle elements 44, it heats the body 21 of the heat transfer device, the air to be heated circulating in the direction of the arrows $f$. In FIGURE 2 it will be seen that the heat transfer takes place under counter-current conditions thus ensuring an efficient operation of the apparatus.

After having circulated through the heat transfer device 21 the cooled combustion gas is sucked through chamber 45, duct 46 and channel 47 by the centrifugal fan 48 and forced to the outside through the outlet pipe 51. In FIGURE 2 it will be seen that the combustion gas is further cooled in the case 25 by contacting the walls of this case which receives on the other hand, on its outer wall, the cold air stream flowing along the fins 26.

As a consequence of the specific arrangement of the heating apparatus of this invention, the heating air is forced under pressure by the fan 11 whilst the combustion gas drawn by the centrifugal fan 48 is sucked or subjected to a vacuum or negative pressure. Therefore, any leakage of combustion gas into the heating air is definitely precluded, thus providing a particularly efficient safety characteristic.

Now reference will be made to FIGURE 5 to describe the diaphragm carburettor 35 of a type already known per se which may be used in the apparatus according to this invention. This carburettor comprises a chamber 52 in which liquid fuel, for example gasoline, is fed from a tank (not shown). The fuel feed is controlled by a jet 53 adapted to be closed by a valve 54. The movements of this valve 54 are controlled by means of a lever 55 fulcrumed at 56 and urged to its jet-closing position by a compression coil spring 60. This lever 55 is adapted to be moved to its valve-opening position by a finger 57 secured to the central zone of a diaphragm 58. This diaphragm 58 closes a chamber 59 communicating through an adjustable needle valve or like metering device 61 with another chamber 62 responsive to the vacuum produced by the centrifugal fan 48.

The vacuum or negative pressure produced by the fan 48 in chambers 62 and 59 causes the diaphragm 58 to recede into this chamber 59, whereby the finger 57 and lever 55 will open the valve 54. Thus, the fuel will be allowed firstly to flow into chamber 59 and, after passing through the adjustable metering device 61, to become mixed in chamber 62 with the air having passed through a filter 63.

Figure 5:
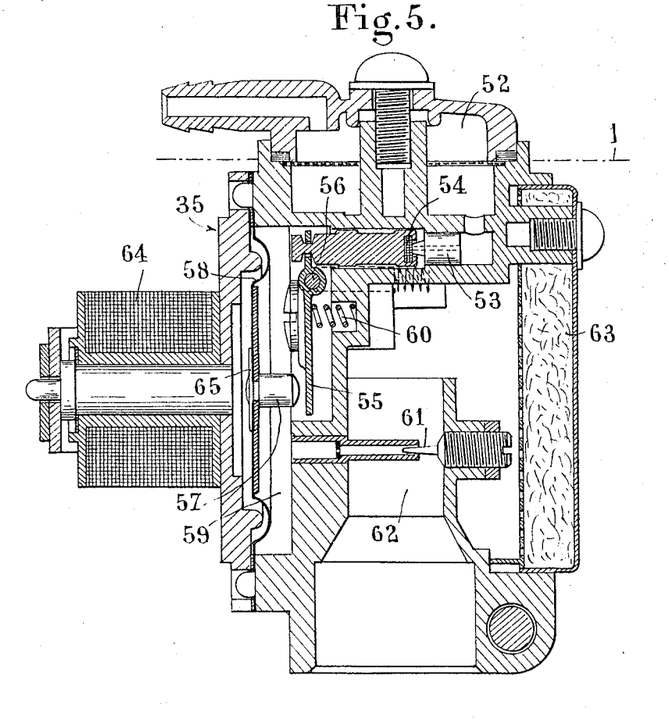
FIGURE 5 is a sectional view showing a diaphragm-type carburettor suitable for use in the fuel feed circuit of the apparatus of this invention.

The combustion in chamber 24 is attended by a reduction in the vacuum prevailing in chambers 62 and 59, so that the diaphragm 58 which had previously been attracted to the right-hand side as seen in FIGURE 5 moves back to its initial position to the left. The return spring 60 urging the lever 55 rotates this lever in the clockwise direction to close the valve 54. Thus, the fuel feed is discontinued and the vacuum in chamber 59 increases again, so that the sequence is repeated.

The above-described carburettor is completed by a safety electromagnet 64 attracting the central core 65 of the diaphragm to prevent same, even under maximum vacuum conditions, from opening the valve 54, as will appear clearly from the following detailed description of the control and safety device.

Figures 6, 7:
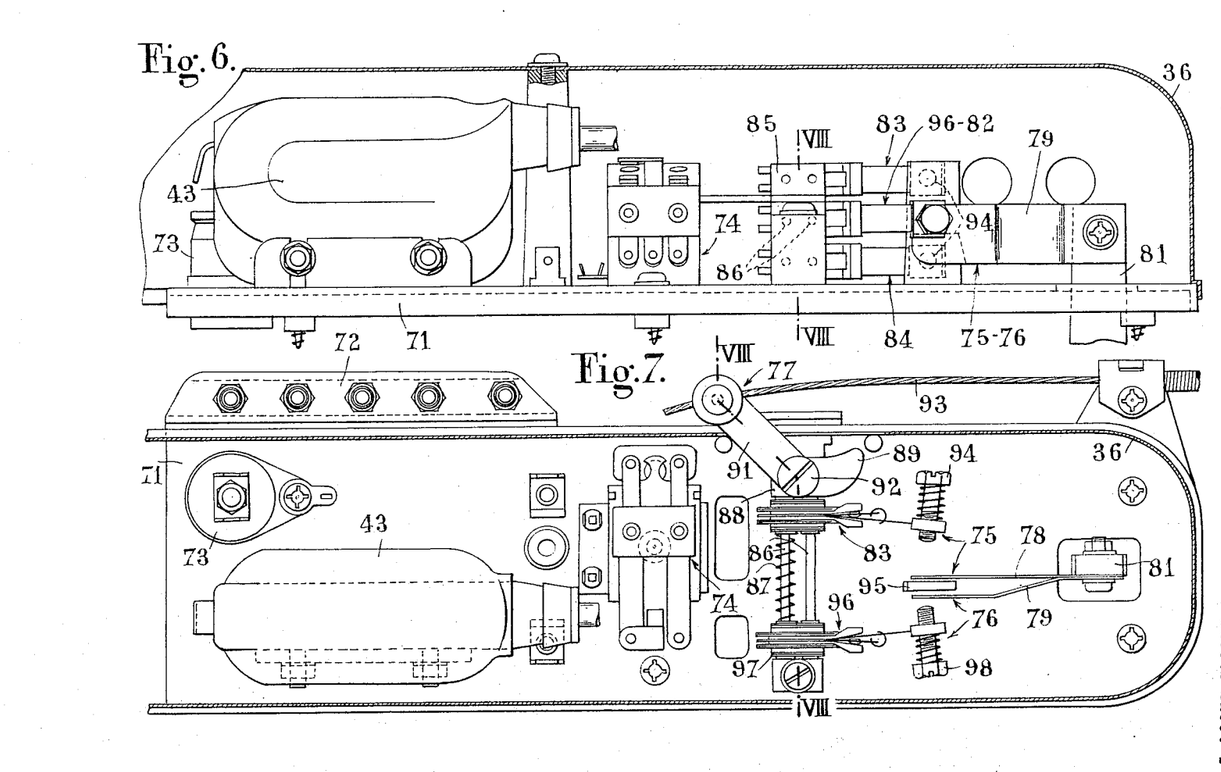
FIGURE 6 is an elevational view showing the control and safety device of the apparatus.
FIGURE 7 is a plan view from above of the control and safety device.

This control and safety device (see FIGURES 6 and 7) comprises in addition to the previously mentioned induction coil 43 various elements carried by a base member 71 secured to the upper portion of the casing of the apparatus. In FIGURES 6 and 7 it will be seen that the base member 71 carries a terminal plate 72, a capacitor 73, a relay 74 for starting the electromotor 6, a reversing regulating switch 75 for controlling the ventilation and heating fans, a safety thermostatic switch 76 and a remote control device 77.

The regulating switch 75 and the thermostatic safety switch 76 are an integral part of a unit comprising two bimetallic strips 78, 79 secured in common at one end to a lug 81 projecting from the combustion chamber of the apparatus. Therefore the temperature of the bimetallic strips 78 and 79 is closely related to the rate of operation of the heating apparatus. They are also responsive to this temperature and assume a variable curvature as a function of its value. The first bimetallic strip 78 cooperates with a snap opening contact 82 mounted together with two adjacent contacts 83 and 84 on a support 85 movable on guide rods 86. The movable support 85 is urged by a spring 87 against a stop 88 carried by the base 71. The movement of the movable support along the guide rods 86 is controlled by a cam 89 rigid with a lever 91 fulcrumed on a pivot pin 92, the lever 91 being connected through a flexible cable 93 to a control member mounted on the instrument panel of the vehicle.

Each one of the superposed contacts 82, 83 and 84 carries on its movable or outer end an adjustment screw 94. The upper and lower contacts 83 and 84 co-act through their adjustment screws 94 with a stop 95 mounted on the base 71 between the bimetallic strips 78 and 79.

The bimetallic strip 79 co-acts with a snap-action front contact 96 mounted on a fixed support 97 registering with the movable support 85. The contact 96 carries at its free end an adjustment screw 98 engageable by the bimetallic strip 79. Now reference will be made more particularly to FIGURES 9 to 13 inclusive to describe in detail the operation of the control and safety device of the heating apparatus of this invention.

Figure 9:
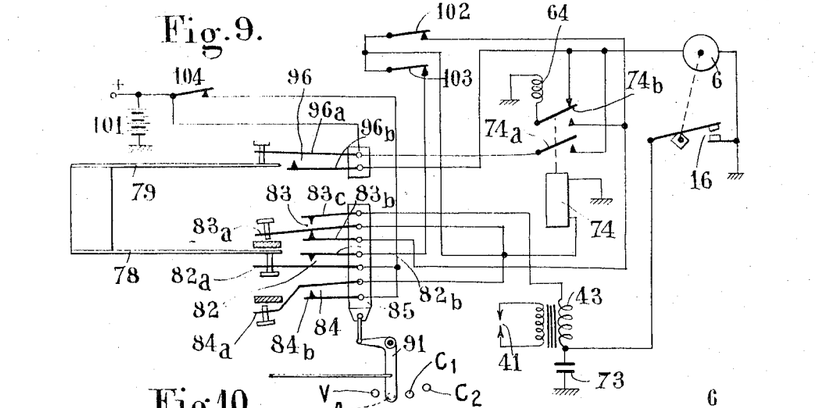
FIGURE 9 is a wiring diagram showing the control and safety circuit in its inoperative position, that is, in the de-energized condition, without heating or ventilation.

In the wiring diagram of FIGURE 9 the various component elements of this device are shown in their inoperative position, that is, without heating or ventilation, when the vehicle is still.

In FIGURE 9 the movable blade 96a of contact 96 is normally held away from the fixed blade 96b by the bimetallic strip 79, so that contact 96 is open in the inoperative position. The movable blade 96a is connected on the one hand to the positive terminal of a storage battery 101 having its negative terminal grounded and on the other hand, through the medium of a front contact 74a of relay 74 to one terminal of electromotor 6, the other terminal of this motor being grounded. Contact 96 is connected in parallel to contact 74a.

The starting relay 74 comprises another contact 74b which, in the inoperative position, connects the carburetor for locking the electromagnet 64 in parallel to the terminals of the electromotor 6, and in its operative position this contact 74b is connected through this electromagnet on the one hand to a normally closed room-temperature contact 102 and on the other hand to a fixed blade 83b of contact 83.

The movable blade 83a of contact 83, which constitutes a normally closed or back contact in the inoperative position with the fixed blade 83b, is connected respectively at one end of the winding of relay 74, the other end of this winding being grounded to the room-temperature contact 102, to another contact 103 closed when the ventilation flaps are open (this contact being connected to the fixed blades 82b of contact 82) and, finally, to the movable blade 84a of contact 84.

The other fixed blade 83c of contact 83 constituting a normally open or front contact with the movable blade 83a is connected to one end of the primary winding of the induction coil 43 having its other end connected to the capacitor 73 and contact breaker 16 connected in parallel.

The movable blade 82a of contact 82 which is a back contact open in the inoperative position and the fixed blade 84b of contact 84 also open in the inoperative position (back contact) are jointly connected through the ignition switch 104 of the vehicle to the positive terminal of the battery 101.

The bimetallic strips 78 and 79 act respectively on the movable blades 82a and 96a of contacts 82 and 96.

Figure 10:
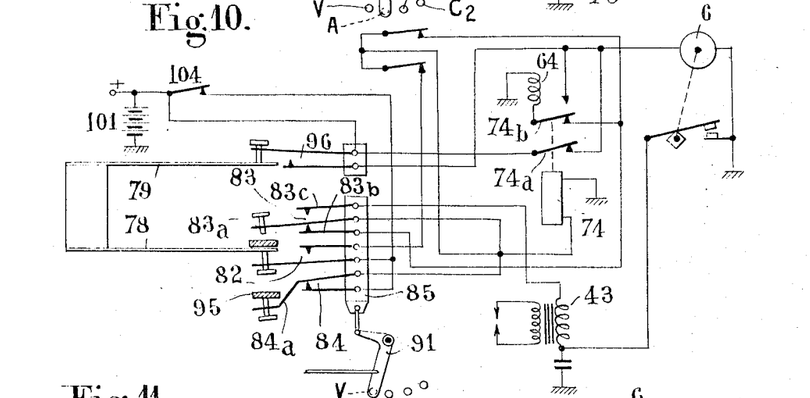
FIGURES 10 to 13 inclusive are wiring diagrams showing the relative positions of the various component elements of the control and safety device in various conditions of operation.

To sum up, in the inoperative condition the contact positions are as follows:

96 open, 83 open between blades 83a and 83c, and closed between blades 83a and 83b, 82 open and 84 open. Under these conditions the movable support 85 and lever 91 are in their inoperative positions shown at A in FIGURE 9. It will be seen that in this case none of the elements 6, 16, 64, 43 and 74 is energized. To set the apparatus in its ventilation positon without heating, the lever 91 is pivoted to position V, as shown in FIGURE 10. The movable support 85 is then shifted upwards as seen in this figure, thus closing contact 84 due to the fact that its movable blade 84a bears on the stop 95. The positions of the other contacts 82, 83, 96 remain unchanged.

Thus, under these conditons, the ignition switch 104 being closed, relay 74 will be energized through the now closed contact 84. The energization of relay 74 causes the contacts 74a and 74b to move to their front or closed position. The closing of contact 74a causes the energization of the electromotor 6 connected directly to the positive terminal of the storage battery 101. On the other hand the passage of contact 74b to its working position involves the energization of the electromagnet 64, whereby the carburetor is locked through the following circuit: positive terminal battery 101, contact 104, contact 84, contact 83a–83b, contact 74b, electromagnet 64. Thus the motor 6 is rotated and drives the fan 11, but no heating effect is produced since the induction coil 43 is not inserted in the circuit (contact 83a–83c being open) and the energized electromagnet 64 prevents the delivery of fuel to the apparatus.

Figure 11:
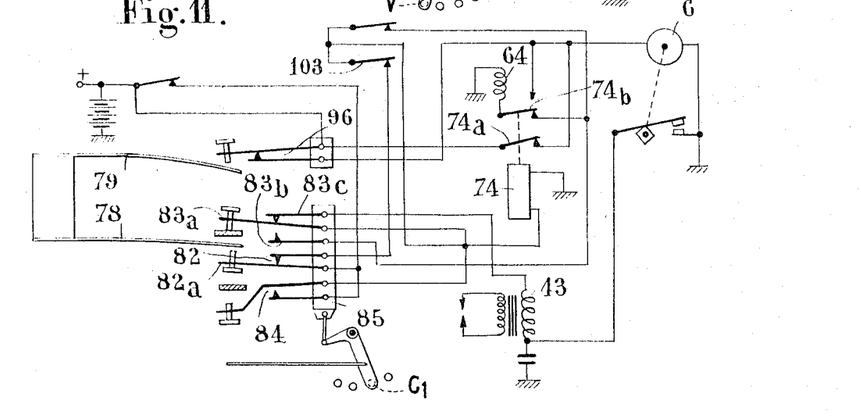

To obtain the low-heating positon (FIGURE 11) the lever 91 is pivoted to its positon C1. This movement of lever 91 causes a downward shift of support 85, as shown in FIGURE 11, this movement closing the contact 82 as well as contact 83a–83c, contact 84 being open. Under these conditions, the relay 74 is energized through contacts 82 and 103 now closed, and the closing of contact 74a will energize as in the preceding case the electromotor 6 which will thus drive the heating fan 11 and the centrifugal suction fan 48. On the other hand, due to the fact that contact 84a–83b is open, the electromagnet 64 is not energized and the diaphragm carburettor is thus released. Finally, due to the closing of contact 83a–83c, the primary winding of the induction coil 43 is energized and the electric ignition device operates.

When the temperature of the bimetallic strips 78 and 79 increases, during the operation of the heating apparatus, these strips are bent as shown in FIGURE 11, and at a certain moment the strip 78 engages the blade 82a so as to open the contact 82. At this time the starting relay 74 is de-energized and its contacts 74a and 74b resume their inoperative positions. However the electromotor 6 is still energized due to the closing of contact 96 as a consequence of the release thereof by the bimetallic strip 79. The opening of contact 82 causes the de-energization of the primary winding circuit of induction coil 43 and therefore the cutting off of the electrical ignition. Finally, the contact 74b by resuming its back position causes the energization of the electromagnet 64 connected in parallel with the motor 6, thus cutting off the fuel supply.

After a certain time period, the bimetallic strip 78 closes the contact 82 again, thus energizing relay 74 and de-energizing electromagnet 64 while inserting the primary winding of the induction coil into the circuit. Under these conditions, the heating phase is resumed.

Figure 12:
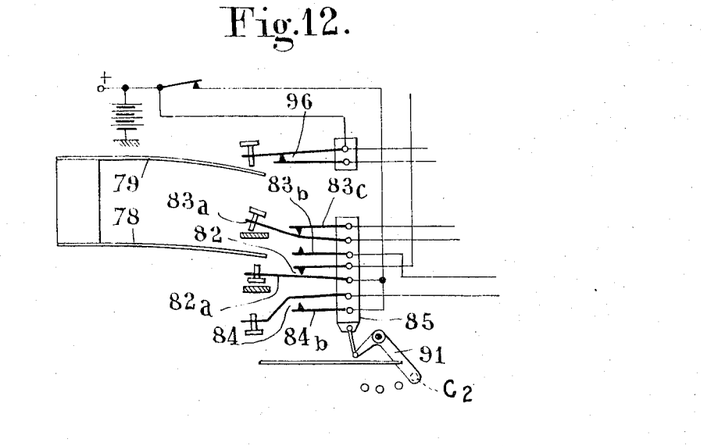

When it is desired to increase the heating effect the lever 91 is pivoted further to position C2, as shown in FIGURE 12. This causes the movable support 85 to be moved downwards as shown in FIGURE 12. The operation is the same as described in connection with FIGURE 11, except that the movable blade 82a of contact 82 is more remote from the bimetallic strip 78, so that this strip can only stop the heating at a higher temperature value.

Figure 13:
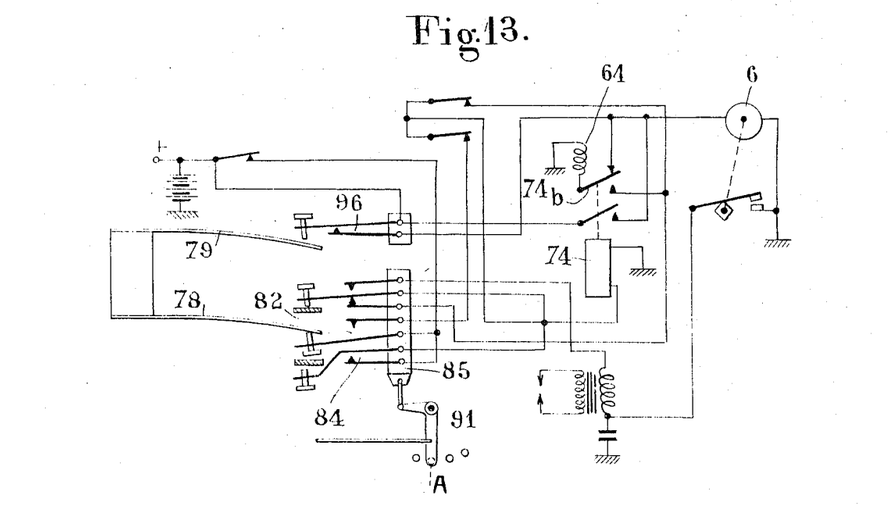

If, when stopped the heating apparatus is very hot, it must be cooled as rapidly as possible, in order to avoid a temperature equalization which might prove too severe for certain parts. FIGURE 13 illustrates the position of the component elements of the control and safety device when, after a certain period of operation at high temperature (with the lever 91 in position C2 as shown in FIGURE 12) this lever is moved back to the stop position A. It will be seen that in this case the bimetallic strips 78, 79 are curved as a consequence of the relatively high temperature attained by the apparatus. The position of the movable support 85 is that shown in FIGURE 9, with contacts 82 and 84 open and therefore relay 74 is de-energized. On the other hand, contact 96 is closed due to the curvature assumed by the bimetallic strip 79. Under these conditions the electromotor 6 is still energized through contacts 96 and on the other hand, as contact 74b is in its back position the electromagnet 64 is energized, thus locking the carburettor and cutting off the supply of fuel to the apparatus.

In the apparatus described hereinabove the fuel is ignited by a high-voltage spark produced between the electrodes of spark plug 41 and the ground. This ground constituting the grid 38 of the burner is used for distributing the carburetted mixture.

At temperatures above 0° C. the vapor tension of the gasoline is sufficient to create with the ambient air a gaseous carburetted mixture easily ignited by the weak heat energy of the spark.

On the other hand, at temperatures below 0° C. and notably at temperatures in the range of −20° C. to −30° C. the vapor tension is practically zero and prevents the creation of a gaseous mixture. Under these conditions, the burner receives at its grid on the one hand an air stream not sufficiently carburetted to be inflammable and on the other hand liquid fuel at low temperature.

Besides, since a relatively strong air stream is created by the exhaust fan in the burner this liquid fuel is scavenged with force and the rapid streaming of fuel on the grid prevents the spark from heating and therefore igniting the fuel.

Now reference will be made to FIGURES 14 and 15 to describe a modified form of embodiment of the burner which avoids the inconveniences set forth hereinabove.

Figure 14:
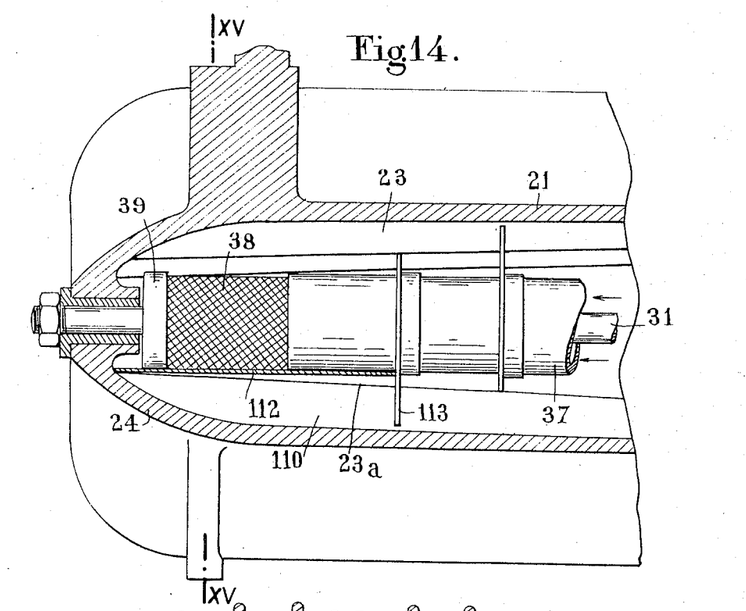
FIGURE 14 is a fragmentary longitudinal section showing a modified form of embodiment of the fuel burner of the heating apparatus.
Figure 15:
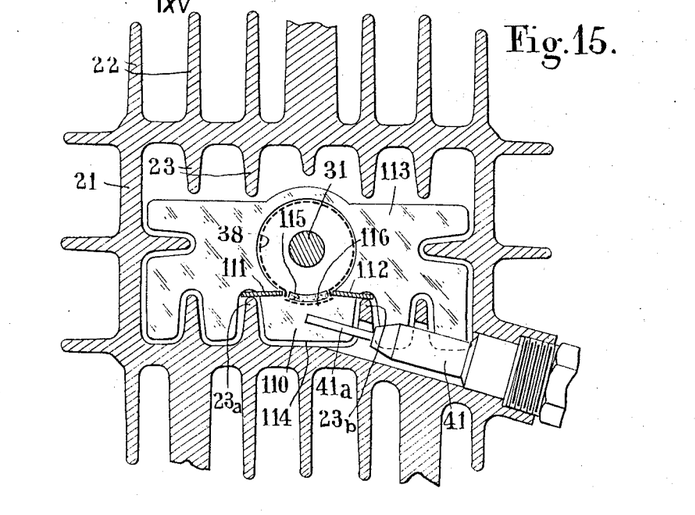
FIGURE 15 is a horizontal section taken upon the line XV—XV of FIGURE 14.

In these FIGURES 14 and 15 various component elements of the heating apparatus already described are shown and designated by the same reference numerals.

In this alternate form of embodiment the burner comprises below the grid 38 a primary relatively closed ignition chamber 110 bounded by a pair of longitudinal inner fins 23a and 23b of the heat transfer body, these fins underlying the grid 38 and extending upwards short of the grid. The electrode 41a of spark plug 41 extends through the fin 23b before emerging into said primary chamber 110. This chamber 110 is closed at its top by a pair of plates 111 and 112 secured to the grid 38 and bearing upon the upper edges of said fins 23a and 23b. Finally, the primary chamber 110 is separated from the other parts of the burner by a transverse partition or baffle plate 113 carried by the central tube 37, this transverse partition having an edge following the contour of the inner wall of the heat transfer body while being somewhat spaced therefrom. Therefore, a gap 114 is left between the edge of said transverse partition 113 and the inner wall of the primary chamber 110 to permit the propagation of the flames towards the remaining parts of the burner.

On the other hand, the grid 38 of the burner carries at its lower portion a relatively small wall portion 115 made from spongy or foam material, for example asbestos fabric. This wall 115 is disposed between the upper plates 111 and 112.

Thus, when the surrounding temperature is very low and the grid 38 receives air not sufficiently carburetted to permit its ignition and liquid fuel (gasoline) the primary chamber 110 provides a relatively narrow space in which the flow of lean gas will not appreciably interfere with the flow of liquid fuel and therefore with the initial ignition thereof. On the other hand, the wall 115 of spongy or foam material will become strongly soaked with liquid fuel so as to further retard its flow.

The lower wall 115 of spongy or foam material of the grid 38 is covered by a fine stainless wire mesh 116 constituting the ground electrode of the spark plug, thus permitting the flashing of the ignition spark at the proper location.

The above-described device permits of producing a pre-ignition in the relatively closed primary chamber 110 to ensure the necessary heating of the burner, and subsequently the total ignition throughout the burner and therefore the flame propagation through the passage 114.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A fuel-combustion heater for automotive vehicle comprising a casing of elongated configuration open at both ends respectively for the ingress of fresh air and the egress of hot air, an electromotor comprising a shaft disposed transversely to said casing, said electromotor being mounted within said casing, a first fan rotatably solid with said motor shaft for forcing heating air into said casing, a combustion device comprising an elongated body constituting a heat transfer unit mounted within said casing and somewhat spaced from the inner wall thereof to provide a space into which the heating air is forced by said first fan, said elongated body having downstream and upstream ends as seen in the direction of flow of the heating air, a combustion chamber provided in said body at the downstream end thereof, a fuel feed device communicating with said combustion chamber, a spark plug housed in said combustion chamber, an electrical ignition device connected to said spark plug, a case mounted inside said casing, communicating with said elongated body at its upstream end and receiving the shaft of said electromotor, and a second fan rotatably solid with said electromotor shaft, and housed outside said casing, said second fan sucking the combustion gas produced within said elongated body.

2. Apparatus as set forth in claim 1, wherein said casing comprises a cylindrical sleeve open at both ends and a pair of shells on which said sleeve is fitted at one end, said sleeve containing the aforesaid combustion device receiving through its opposite end said spark plug connected to said electrical ignition device, said apparatus further comprising on one of said pair of shells a cylindrical skirt constituting an outward extension of said shell and providing a fresh air inlet port, a support disposed across said cylindrical skirt and a contact breaker mounted on said support, said contact breaker being incorporated in said electrical ignition device.

3. Apparatus as set forth in claim 1, wherein said combustion device housed in said cylindrical sleeve comprises a central elongated body constituting a heat transfer unit, longitudinal internal fins and longitudinal external fins formed on said body, a cap constituting a combustion chamber and closing said central body at its downstream end, a fuel-feed and combustion gas exhaust case closing said central body at its upstream end, a fuel feed passage provided in said case, a diaphragm carburettor communicating with said fuel feed passage, an annular chamber formed in said case and communicating with the interior of said central body, and a combustion gas exhaust duct communicating with said annular chamber and with said second fan for sucking said combustion gas.

4. Apparatus as set forth in claim 3, wherein said elongated central body and said cap closing its downstream end constitute a unitary member.

5. Apparatus as set forth in claim 3, wherein said elongated central body and said case closing its upstream end constitute a unitary member.

6. Apparatus as set forth in claim 3, comprising a bolt extending coaxially through said elongated central body of said combustion device and having one end secured to said combustion-chamber forming cap, a stop provided at the opposite end of said bolt, and a coil compression spring bearing on the one hand on said stop and on the other hand on said fuel-feed and combustion-gas exhaust case, in order to urge same in sealing engagement against said elongated central body.

7. Apparatus as set forth in claim 6, comprising a central tube surrounding said bolt holding said case on said central body, said central tube constituting an extension of said fuel-feed passage formed in said fuel-feed and combustion-gas exhaust case, and a metal grid or wire mesh mounted on the downstream end of said central tube, in the zone of said combustion chamber whereby the fuel may penetrate through said grid or wire mesh into said combustion chamber.

8. Apparatus as set forth in claim 7, comprising a plurality of baffle means mounted on the outer periphery of said central fuel feed tube and adapted to deflect the combustion flame and gas towards the internal fins of said central body.

9. Apparatus as set forth in claim 1, comprising a base member secured to the casing of the apparatus, a lug projecting externally of said combustion chamber through said base member and of which the temperature is subordinate to the rate of operation of the apparatus, a first bimetallic strip and a second bimetallic strip secured by one of their ends to said lug, a first regulating and stopping contact responsive to said first bimetallic strip and a second contact responsive to said second bimetallic strip, said second contact controlling the keeping of said electromotor in its energized condition for ventilation purpose when the apparatus is stopped while being still at a relatively high temperature.

10. Apparatus as set forth in claim 9, comprising a support movable on said base member and carrying said first regulating and stopping contact, a cam controlling the movement of said movable support and means for permitting the remote control of said cam for moving said support towards and away from said first bimetallic strip.

11. Apparatus as set forth in claim 10, comprising a third contact and a fourth contact both mounted on said movable support carrying said first regulating and stopping contact, a fixed stop co-acting with said third and fourth contacts, an electromagnet for locking said fuel-feed device, said third contact being connected to the energizing circuit of said electromotor and of said electrical ignition device to permit the operation of the apparatus as a heater, said fourth contact being so inserted in said circuit for energizing said electromotor and said electromagnet controlling the locking of said fuel feed device as to permit the operation of the apparatus only as a ventilation unit.

12. Apparatus as set forth in claim 1, comprising at the lower portion of said combustion chamber a relatively closed primary chamber in which the carburetted mixture is subjected to a pre-ignition, a secondary chamber consisting of the remaining part of said elongated body constituting said heat transfer unit, and a passage permitting the communication between said primary and secondary chambers, said passage being sufficient to permit the propagation of the flame throughout the inner space of said elongated body.

13. Apparatus as set forth in claim 1, comprising in the zone of said combustion chamber two internal longitudinal fins of said elongated body acting as a heat transfer unit and a transverse partition defining with said fins, in the transverse and longitudinal directions, the primary pre-ignition chamber, the edges of said transverse partition being somewhat spaced from the inner surface of said elongated body acting as a heat transfer unit, a grid connected to said fuel feed device and through which the fuel is adapted to be injected, and a pair of plates carried by said grid to limit the upper portion of said primary pre-ignition chamber by bearing upon said pair of internal longitudinal fins of said elongated body acting as a heat transfer unit.

14. Apparatus as set forth in claim 13, wherein said spark plug comprises a central electrode projecting in said primary chamber through one of said longitudinal fins defining said chamber.

15. Apparatus as set forth in claim 13, comprising a relatively small partition of spongy material which is carried by the lower portion of said grid.

16. Apparatus as set forth in claim 15, comprising a fine stainless metal wire mesh covering said partition of spongy material and constituting the ground electrode of said spark plug.

References Cited by the Examiner

UNITED STATES PATENTS

| | | | |
|---|---|---|---|
| 2,010,920 | 9/1935 | Karsel. | |
| 2,432,314 | 12/1947 | Holthouse | 126—110 |
| 2,460,983 | 2/1949 | Hess | 126—110 |
| 2,473,699 | 6/1949 | Bennett | 126—110 |
| 2,691,413 | 10/1954 | Leslie et al. | 126—110 X |

JAMES W. WESTHAVER, *Primary Examiner.*